May 14, 1963 R. B. DUNLAP ET AL 3,089,939
DIP-TYPE ADHESIVE CONTAINER
Filed April 6, 1960
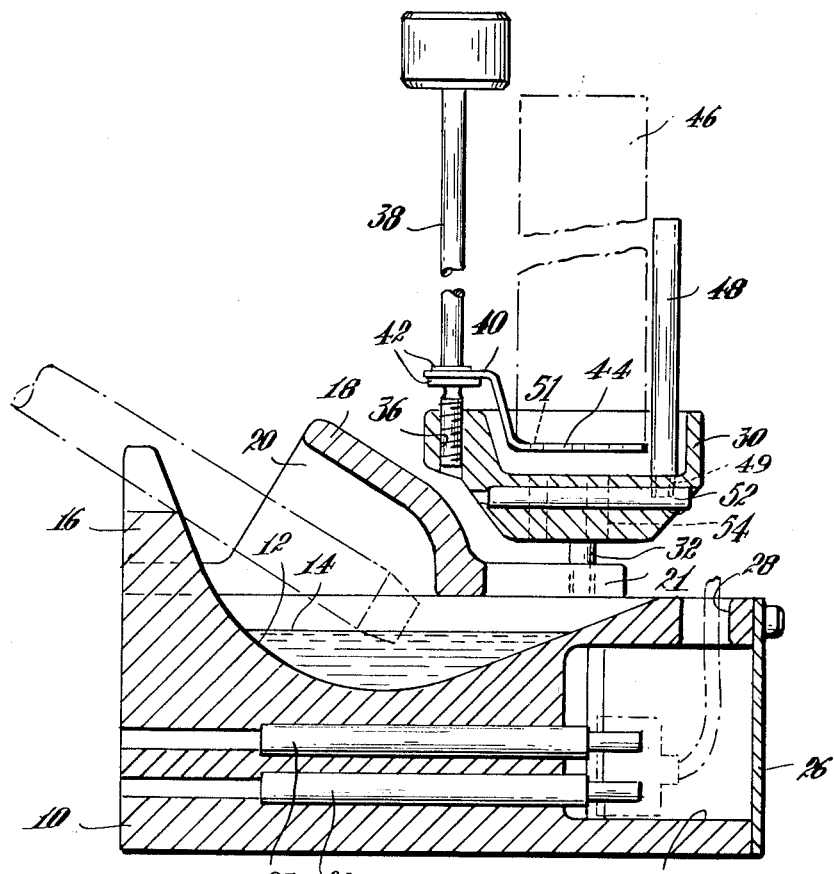
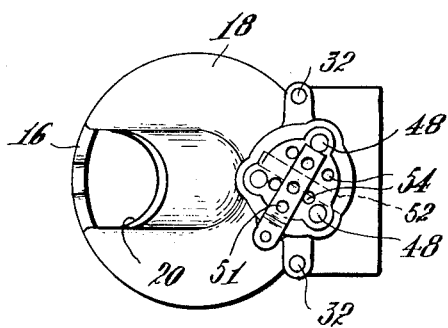
Fig. 1
Fig. 2
Inventors
Robert B. Dunlap
Jacob S. Kamborian
by Roberts, Cushman & Grover
Att'ys

United States Patent Office 3,089,939
Patented May 14, 1963

3,089,939
DIP-TYPE ADHESIVE CONTAINER
Robert B. Dunlap, Medway, and Jacob S. Kamborian, West Newton, Mass.; said Dunlap assignor to said Kamborian
Filed Apr. 6, 1960, Ser. No. 20,460
9 Claims. (Cl. 219—19)

This invention relates to apparatus for providing a continuous supply of molten adhesive and more especially to a dip-type container into which an applicator may be thrust to pick up a quantity of molten adhesive.

The principal objects of the invention are to provide an apparatus in which a body of molten adhesive may be kept melted for instant use while partially protected from the atmosphere and yet is easily accessible to an applicator; to provide an apparatus in which the body of molten adhesive may be replenished as fast as it is used up; and to provide an apparatus in which adhesive is melted from a block of adhesive, or the like, and the rate of melting may be controlled substantially in proportion to the rate of use. Other objects are to provide a container which is compact, easily adjustable, easy to keep clean and economical of the adhesive.

As herein illustrated, the apparatus comprises a receptacle for retaining a supply of molten adhesive, a support for a block of adhesive positioned above the receptacle, heating means interposed between the receptacle and the support for heating the lower end of a block of adhesive resting on the support, so that the molten adhesive gravitates into the receptacle, and means for adjusting the distance between the heating means and the support so as to control the rate at which the block is melted. The receptacle has a base containing a shallow bowl partially covered by a hood, the latter having an opening therein through which an applicator may be thrust into the bowl. A melting pot is mounted on the base above the bowl and the support for the block of adhesive is situated within the melting pot and adjustable heightwise with respect to the bottom of the melting pot by means of a screw. A heating element is disposed in the bottom of the melting pot below the support and by adjusting the heightwise position of the support within the melting pot the lower end of the block may be moved to or from the heating element. There are guides associated with the melting pot to support the lateral surfaces of the block and there is means at the bottom of the melting pot for conducting the molten adhesive into the bowl. There are also heating elements in the base, beneath the bowl, which are operable independently of each other to supply different amounts of heat to the base.

The invention will now be described in greater detail with reference to the accompanying drawings wherein:

FIG. 1 is a vertical section through the apparatus with some parts shown in elevation; and FIG. 2 is a plan view as seen from the top to much smaller scale.

Referring to the drawings, the apparatus has a base 10 of substantially circular horizontal section, as indicated in FIG. 2, which contains a shallow bowl 12 in its upper part for holding a body of molten adhesive 14. At one side of the base there is an upwardly projecting notched post 16 for supporting the shaft of an applicator thrust into the bowl. A hood 18 is mounted on the top of the base so as partially to cover the bowl and has an opening 20 at one edge, which is symmetrically disposed with reference to the notched post 16, to permit the applicator to be thrust into the bowl, and an opening 21 at its opposite edge through which adhesive is supplied to the bowl.

In the base there are two heating elements 22 and 23 which are adapted to keep the molten adhesive liquid in the bowl 12. There is a chamber 24 in the rear end of the base into which the heating elements project for connection to electric junction blocks. A plate 26 is bolted over the chamber 24 and there is an aperture 28 in the top wall of the chamber through which suitable wiring may extend to the junction blocks. One of the elements is for low heating and the other for high heating.

A melting pot 30 is mounted on the base above the bowl on a pair of legs 32—32, the lower ends of which are screwed into the top of the base. At one side of the pot 30 there is a threaded opening 36 into which is screwed the lower end of a spindle 38. A support 40 is mounted on the spindle between collars 42—42 for vertical movement relative to the bottom of the pot. The support 40 has a horizontal arm 44 situated within the pot, substantially parallel to its bottom, adapted to support the lower end of a block or stick of solid adhesive 46 above the bottom of the pot. Rotation of the spindle 38 will thus raise and lower the lower end of the adhesive relative to the bottom. To prevent tipping over three vertically disposed guide rods 48, having lower threaded ends 49 are screwed into the bottom of the pot so as to have contact with the lateral surface of the block at about equidistant points.

A heating element 52 is disposed in the bottom wall of the pot and there are four ports 54 in the bottom of the pot which extend downwardly, two at each side of the heating element, through the bottom for discharging adhesive therefrom. The adhesive gravitates from the bottom of the pot and through the opening 21 in the hood into the bowl. Preferably the horizontal portion 44 of the support contains a plurality of openings 51 through which adhesive can flow as it becomes liquid.

The amount of adhesive melted from the lower end of the block may be controlled by adjusting the heightwise position of its lower end relative to the heating element 52 and this is effected by rotating the spindle so as to raise or lower the arm 44. As thus constructed, it is easy enough by adjustment of the lower end of the block of adhesive relative to the heating element to control the rate of melting so that adhesive is supplied to the bowl at approximately the same rate that it is being removed therefrom by the applicator so that substantially no more adhesive is being melted than is required.

The heating elements 22 and 23, as previously stated, are wired so as to be independently operable, the element 20 being designed to supply high heat and the element 22 low heat. The element 23 is used for daytime heating when the apparatus is being employed substantially continuously and the element 22 is used to keep the apparatus heated at a low temperature when not in use, for example, during the night so that any melted adhesive remaining in the bowl 12 overnight may be kept molten.

The adhesive melting apparatus of this invention finds particular utility in supplying molten adhesive to the adhesive applicator disclosed in pending application Serial No. 20,461, filed April 6, 1960, for carrying out the method disclosed in pending application Serial No. 28,408, filed May 11, 1960.

It should be understood that the present disclosure is for the purpose of illustration only and that this invention includes all modifications and equivalents which fall within the scope of the appended claims.

We claim:

1. Adhesive melting apparatus comprising a receptacle for retaining a quantity of melted adhesive, a hood partially covering the receptacle leaving however an opening through which an applicator may be thrust into the receptacle, a support on the receptacle for holding a block of adhesive above the receptacle in an upright position with its lower end adjacent the receptacle, a heating element situated between the support and the receptacle adjacent the lower end of the block of adhesive for melting the adhesive, means for gravitationally conducting the melted adhesive into the receptacle, and means for adjusting the distance between the heating element and the support so as to control the rate at which the block is melted.

2. A dip container for adhesive comprising a base containing a shallow bowl, a hood partially covering the bowl, said hood having an opening at one edge through which an applicator may be thrust into the bowl and an opening at another edge through which molten adhesive may be supplied to the bowl, a melting pot mounted on the base above the bowl, an opening at the bottom of the pot above the opening at the other edge of the hood through which adhesive is free to gravitate, a heating element incorporated in the bottom of the pot, and an adhesive support associated with the pot adapted to hold the stick of adhesive with its lower end adjacent the heating element at the bottom of the pot.

3. A dip container for adhesive comprising a base containing a shallow bowl, a hood partially covering the bowl leaving an opening at one edge through which an applicator may be thrust into the bowl and an opening at the other edge through which adhesive is supplied to the bowl, a melting pot mounted on the base, a heating element incorporated in the bottom of the pot and an adjustable support situated in the pot upon which a stick of adhesive may be placed so that its lower end is situated within the pot above the heating element, said support being movable heightwise with respect to the bottom of the pot to adjust the proximity of the lower end of the stick with respect to the heating element, and means at the bottom of the pot through which melted adhesive is free to gravitate to and through the opening at said other edge of the hood into the bowl in the base.

4. A dip container for adhesive comprising a base containing a shallow bowl, a hood partially covering the bowl leaving however an opening at one edge through which an applicator may be thrust into the bowl and an opening at another edge through which adhesive may be supplied to the bowl, a heating element incorporated in the base beneath the bowl, a melting pot mounted on the base above the bowl, a heating element incorporated in the bottom of the melting pot, a supporting element situated within the pot having a horizontal arm upon which a stick of adhesive may be placed in an upright position with its lower end resting thereon, a screw mounting the support for heightwise movement of the arm with respect to the heating element at the bottom of the pot, guides for holding the stick upright and means for conducting the melted adhesive from the bottom of the pot to the bowl.

5. A dip container for adhesive comprising a base containing a shallow bowl, a hood partially covering the bowl leaving however an opening at one edge through which an applicator may be thrust into the bowl and an opening at another edge through which adhesive may be supplied to the bowl, means incorporated in the base beneath the bowl for heating the bowl, a melting pot mounted on the base above the bowl, means at the bottom of the pot for heating the pot, a support, a screw on the pot mounting the support for heightwise movement relative to the heating means at the bottom, said support being adapted to support the lower end of a stick of adhesive placed thereon adjacent the heating element, guides for supporting the lateral sides of the stick and means for conducting melted adhesive from the bottom of the pot to the bowl.

6. A dip container according to claim 5, wherein the support is narrow and contains a plurality of openings through it.

7. A dip container according to claim 5, wherein the heating means incorporated in the base comprises two independently operable heating elements so that different amounts of heat may be supplied to the base.

8. An adhesive melting apparatus comprising: a bowl for retaining a supply of molten adhesive; means for applying heat to the bowl to maintain the supply molten; a support, for supporting a block of adhesive from its bottom, positioned spacedly above the bowl; heating means interposed between the bowl and the support for heating the lower end of the block of adhesive, said support and heating means being so constructed as to permit adhesive melted from the bottom of the block by the heating means to gravitate into the bowl; and means for adjusting the heightwise distance between the heating means and the support so as to control the rate at which the block is melted.

9. An adhesive melting apparatus comprising: a base containing an upwardly facing bowl for retaining a supply of molten adhesive; means for heating the bowl to maintain the supply molten; a melting pot mounted on the base and located above the bowl; heating means disposed in the pot; at least one port extending heightwise through the pot; a support arm located spacedly above the melting pot for supporting a block of adhesive from its bottom; and means mounting the support arm on the pot for heightwise adjustment toward and away from the pot, whereby the rate at which solid adhesive is melted from the bottom of the block by the heating means and gravitationally flows through the port into the bowl may be adjusted.

References Cited in the file of this patent

UNITED STATES PATENTS

| | | |
|---|---|---|
| 1,151,605 | Morgan | Aug. 31, 1915 |
| 1,321,071 | Hadaway | Nov. 4, 1919 |
| 1,437,528 | Fightfoot | Dec. 5, 1922 |
| 1,856,414 | Groh | May 3, 1932 |
| 2,090,666 | Copeland | Aug. 24, 1937 |
| 2,165,767 | Smith | July 11, 1939 |
| 2,235,738 | Curtis | Mar. 18, 1941 |
| 2,773,496 | Czarnecki | Dec. 11, 1956 |
| 2,809,772 | Weisz | Oct. 15, 1957 |
| 2,979,234 | Kamborian | Apr. 11, 1961 |
| 3,011,042 | Kamborian | Nov. 28, 1961 |

FOREIGN PATENTS

| | | |
|---|---|---|
| 476,047 | Germany | May 6, 1929 |